United States Patent [19]

Wisdom

[11] Patent Number: 5,132,127
[45] Date of Patent: Jul. 21, 1992

[54] PROCESS FOR PREPARING AN EXTRUDED FOOD PRODUCT

[75] Inventor: Lawrence W. Wisdom, Dallas, Tex.

[73] Assignee: Recot, Inc., Plano, Tex.

[21] Appl. No.: 557,830

[22] Filed: Jul. 26, 1990

Related U.S. Application Data

[63] Continuation-in-part of Ser. No. 171,648, Mar. 22, 1988, abandoned.

[51] Int. Cl.⁵ .................. A23L 1/10; A23L 1/18; A23L 1/212; A23L 1/216
[52] U.S. Cl. .................... 426/549; 426/392; 426/438; 426/440; 426/447; 426/448; 426/456; 426/559; 426/560; 426/615; 426/616; 426/625; 426/637
[58] Field of Search ............ 426/637, 549, 615, 625, 426/616, 392, 447, 448, 438, 440, 456, 559, 560

[56] References Cited

U.S. PATENT DOCUMENTS

| | | | |
|---|---|---|---|
| 4,140,801 | 2/1979 | Hilton et al. | 426/637 |
| 4,160,849 | 7/1979 | Huchette et al. | 426/637 |
| 4,198,437 | 4/1980 | Citti et al. | 426/637 |
| 4,221,842 | 9/1980 | Toft | 426/637 |

*Primary Examiner*—Jeanette Hunter
*Assistant Examiner*—Mary S. Mims
*Attorney, Agent, or Firm*—Rothwell, Figg, Ernst & Kurz

[57] ABSTRACT

A process for making a shelf-stable food product comprises blending a high moisture material that provides flavor and substantially all of the moisture to the stack food product with one or more low moisture farinaceous base ingredients to produce a dough, extruding the dough into the desired shape, drying the extruded dough and ultimately cooking the dried product to produce a shelf-stable food product. The high moisture material can comprise a cellular fruit or vegetable material which has been vigorously macerated, a liquid per se, such as a beverage, or a dairy product such as yogurt.

21 Claims, No Drawings

1

PROCESS FOR PREPARING AN EXTRUDED FOOD PRODUCT

CROSS REFERENCE TO RELATED APPLICATION

This application is a continuation-in-part of application Ser. No. 171,648, filed Mar. 22, 1988 now abandoned.

BACKGROUND OF THE INVENTION

1. Field of the Invention

The present invention relates to a process for manufacturing a stable food product and to products produced by the process. More particularly, the invention relates to a process for making a snack food product wherein all or substantially all of the moisture is derived from the flavor source; the addition of excess make-up water is avoided, thus improving the retention of natural flavors and textures.

2. Description of the Background Art

A variety of flavored snack food products are available on the market today and are very popular consumer items. Chip-type products flavored with various spices and with different cheeses are especially well-known. Such products are produced both from intact slices, such as potato slices, as well as from extruded pastes or doughs, such as ground corn-based dough. Fruit flavored snack foods typically have been made by dehydrating pieces of fruit, blending them with water and the dry ingredients which will be used to make the chip, and then extruding the blended mixture and further processing the extrudate. Although this process produces an acceptable product, some of the flavor and texture of the fruit pieces is lost in the dehydration-rehydration process. The steps of dehydrating and then rehydrating the fruit also can be time-consuming, and add to the cost of the final product.

U.S. Pat. No. 4,198,437 (Citti et al.; Apr. 15, 1980), relates to the production of a french fry-like potato product by extruding a potato dough into the desired shape. The potato dough is prepared from a combination of riced, blanched potatoes, dehydrated potatoes (e.g. granulated potato flakes) and an emulsifier in appropriate proportions to arrive at a dough of between about 60 to 75 percent by weight of water.

U.S. Pat. Nos. 3,937,848 (Campbell et al., Feb. 10, 1976) and 3,935,322 (Weiss et al., Jan. 27, 1976) relate to the production of "fabricated" chips from, for example, potato flakes and/or granules and water.

U.S. Pat. No. 4,126,706 (Hilton; Nov. 21, 1978) also relates to the production of snack food products from extruded doughs. The doughs are prepared, for example, from dehydrated potato flakes or granules.

U.S. Pat. No. 4,719,118 (Thomas; Jan. 12, 1988) relates to snack food products made from a mixture of water and low-fat dairy cheese or milk curd. The mixture is sheeted, partially dried and then puffed. The use of farinaceous ingredients is discouraged.

Many of the prior art snack food products are prepared from doughs produced by rehydrating dehydrated flakes, granules and the like which have been prepared from vegetables, particularly starchy vegetables such as potatoes and corn. As known to those skilled in the art, the production of such flakes and granules includes the step of gently macerating the vegetable. The macerating step must be relatively gentle, substantially avoiding the destruction of the cell walls, so that excessive starch is not released. Excessive starch produces a very gummy, pasty mass which is difficult or impossible to flake or granulate. Unfortunately, this gentle macerating step also fails to release a portion of the flavor of the fruit which, like the starch component, is contained within the walls of individual cells.

The snack food products produced from extruded doughs usually are cooked virtually immediately. The pre-cooked product is not suitable for transport over long distances to off-site cooking facilities, as the high moisture content tends to promote rapid spoiling. Freezing the pre-cooked product often is the only means for stabilizing the moisture and safely permitting such transport.

Accordingly, it is an object of this invention to provide a simplified process for making a stable snack food product from a high moisture raw material wherein the original pulp, juice or other flavor-containing component of the high moisture material can be used, rather than dehydrating the component and then recreating the original moisture by adding water to the dehydrated product. Another object of this invention is to provide a simplified process for making a stable snack food product from a liquid product wherein the liquid product provides the required flavor and moisture. Yet another object of the invention is to provide a process for preparing a stable pre-cooked snack food "pellet" product which can be shipped over long distances without the need for refrigeration, and then subsequently cooked and packaged.

SUMMARY OF THE INVENTION

The present invention relates to a process for preparing a shelf stable snack food product, one component of which is a high moisture material that provides flavor and, optionally, texture, to the product. In one embodiment of the invention the process comprises:

a) macerating to a soggy pulp a high moisture material that provides flavor and substantially all of the moisture to the snack food product;

b) blending the soggy pulp with one or more low moisture farinaceous base ingredients to produce a dough comprising about 25% to about 50% moisture;

c) extruding the dough into a desired shape; and d) drying the extruded product to about 8% to about 15% moisture.

A product so prepared can be cooked immediately, or can be treated as a "pellet" product whereby it is transported off-site for eventual cooking and packaging.

The high moisture material can be selected from, among others, "cellular" materials such as fruits and vegetables which are vigorously macerated to release natural flavors. In other embodiments, the high moisture material is a liquid over se, such as a solution or suspension, which provides flavor and required moisture to the snack food product and is mixed directly with one or more low moisture, farinaceous base ingredients to produce a blended product comprising about 25% to about 50% moisture; the remaining steps in the process are the same as in the embodiment discussed above. In a second alternative embodiment, the high moisture material is a material which provides flavor to the snack food product but which can be added to the base ingredients without having to undergo an initial maceration step, such as yogurt and other dairy products.

DETAILED DESCRIPTION OF THE INVENTION

The present invention provides a process for the manufacture of a shelf-stable snack food product wherein one component of the product comprises at least one high moisture material that provides flavor and the required moisture to the final product. It has been discovered that such high moisture materials advantageously can be used directly in a process for making shelf-stable products without first having to dehydrate and subsequently rehydrate them.

The high moisture material imparts flavor and, optionally, textural attributes, to the snack food product. The term "high moisture" material encompasses both liquids, such as solutions or suspensions, and other materials that comprise at least about 40% moisture and typically comprise about 70% moisture. Suitable materials include dairy foods such as cottage cheese and yogurt; various fruits, such as apples, bananas, pears, lemons, grapes and tomatoes; and vegetables, including carrots, celery, lettuce, spinach, onions, potatoes and sweet potatoes. Fruits and vegetables are preferred and are macerated into a soggy pulp as described herein. As the process of this invention is low in heat stress, fruits and vegetables which contain high levels of reducing sugars can be used without undesirable browning occurring during processing.

Alternatively, the high moisture material can comprise a liquid, such as a beverage, substantially all the solids of which are soluble, including milk, beer, fruit juices, vegetable juices, wine and carbonated drinks. A number of these beverages, such as milk and juices, can be used to advantage in this process because of the low degree of heat stress placed upon them.

Fruits or vegetables should be washed prior to use. Various types of cleaning or washing equipment can be used, such as a standard potato chip peeler equipped with brushes or abrasive rollers.

The maceration into a soggy pulp of high moisture fruit or vegetable ("cellular") ingredients is conducted in a vigorous manner to release natural flavors contained within the plant cells. For the purposes of this invention, the term "maceration" means such vigorous maceration. Thus, a large proportion of the plant cells will be disrupted by the maceration step. This is in contrast to the gentle maceration process carried out in the production of dehydrated potato flakes and granules, for example, which is a gentler process whereby cells are not disrupted to a great extent. The use of a high speed Urschel mill is preferred in carrying out the maceration step of the present process.

If the high moisture material is a liquid or a relatively soft material, such as cottage cheese or yogurt, it is not necessary to macerate the material and it simply is blended with the base ingredients to produce a dough.

The high moisture material provides substantially all of the moisture required during processing. By "substantially all of the moisture" it is meant that although additional moisture may in fact be added, for example for the purpose of providing flavor, or is absorbed from the atmosphere during processing, such additional moisture is not needed in order to process the dough blend. By avoiding the need to add additional moisture, the present process helps preserve (does not dilute) the natural flavors present in the high moisture component and, subsequently, in the finished product.

The high moisture material can be blended with farinaceous base ingredients by any one of several methods. The high moisture material simply can be mixed in a blender such as a standard ribbon blender. Alternatively, depending on the design of the extruder to be used in the following step of the process, the blending can take place directly in the extruder. A twin-screw extruder is an example of an extruder wherein the mixing can take place in the extruder bore, the ingredients being injected through various ports and then contacted with co-rotating twin extruder screws in the barrel of the extruder. Regardless of the precise manner and equipment used to blend the high moisture material and the dry ingredients, the final dough blend desirably will comprise from about 25% to about 50% moisture and preferably about 35% moisture.

The low moisture farinaceous base materials or ingredients that are mixed with the pulp can vary depending upon the source of the high moisture raw material and the nature of the final product desired. Generally, the base ingredients are in granular or powdered form, such as meal, flour, or starch derived from corn, wheat, rice, oats, barley, potatoes, rye, tapioca, and other cereal crops, legumes, tubers, or mixtures thereof. One or more flavoring ingredients, in amounts necessary to provide a desired effect, also can be included. "Low moisture" is defined herein as an edible material or mixture of materials that has a moisture content that does not exceed about 15% by weight of the material. Although the weight to weight ratio of base ingredients to high moisture material can vary depending upon the water content of the high moisture material, the desired taste attributes of the desired product and the amount of moisture desired in the dough, generally the ratio of base ingredients to high moisture ingredients is about 70:30 to about 50:50 by weight.

The dough blend of high moisture material and dry ingredients undergoes further processing to form it into a desired shape. An appropriate apparatus for accomplishing this step is an extruder which discharges the blend of pulp and dry ingredients through a die. The extruder is capable of generating super-atmospheric pressures and elevated temperatures in the material being extruded.

Depending upon the type of extruder employed, the high moisture and the low moisture base ingredients, either as a blend or individually, are injected into the extruder. As the mixture moves through the barrel of the extruder, the barrel pressure increases. Generally, the extruder is operated to produce a barrel pressure of at least about 200 psi and a temperature of at least 200° F. within the barrel.

The dough mixture exits the extruder barrel through a die which can form the mixture into the desired cross sectional configuration. For example, one can employ a die having an opening that will produce a ribbon or a cylinder of the extrudate, or dies that will produce a tubular or a C-shaped extrudate. If one of the latter types of dies is used, the extruded product can be filled with a flavoring material, such as a paste-like or creamy material (e.g. a cheese-flavored filling or peanut butter), after it has been fully processed.

The hot extrudate emerges from the die into a zone of ambient pressure below the vapor pressure of the water in the mixture; that is, normal atmospheric pressure. Exposure of the extrudate to the reduced pressure environment readily allows a portion of the water in the mixture to vaporize so that the resulting product has a moisture content of about 20% to about 45%. Preferably, the moisture content is about 30%.

As the extrudate exits the die it is stretched. This can be readily accomplished by laying the extrudate on a conveyor. Gravity is sufficient to cause enough frictional force that the weight of the ribbon and a difference between the speed of the conveyor and the speed at which the extrudate exits the die can be sufficient to stretch the extrudate successfully.

The extrudate exiting the extruder is hot and sticky. As it moves along the conveyor, however, it becomes cool enough to touch. An air current can be passed over the cooling extrudate to further firm and harden it for subsequent cutting into the desired final product size and shape.

The extrudate is cut using a conventional commercial cutter and then is further dried to stabilize the cut pieces at about 8% to about 15% by weight moisture. Preferably, the products are dried to about 12% moisture. The drying can be carried out, for example, by passing ambient air over the product pieces. Depending upon the temperature and relative humidity and the product formula, the drying can be accomplished in about 30 minutes to about 12 hours.

The dried product, if desired, is transported in its pre-cooked state for off-site cooking and packaging. The low moisture of the pre-cooked "pellet" renders the product stable and suitable for use in a system of central product preparation followed by transport to a plurality of local or regional cooking and packaging facilities. Such a system provides advantages to the large-volume snack food industry; duplication of processing steps is avoided, while local or regional cooking and packaging ensures product freshness. The stability of the present "pellet" products when stored and transported under ambient conditions provides significant advantages over pellet products which must be refrigerated or frozen.

The product ultimately is cooked, such as by hot oil frying, hot air puffing or other methods, depending upon the end product desired. Frying may be carried out in any edible oil, such as cottonseed, soybean, sesame or peanut oil, at a temperature that is between about 220° F. and the smoking point of the oil. Preferably, the frying temperature is between about 325° F. and about 400° F. The frying time will vary, depending upon the temperature of the oil and the nature of the product, but generally will be in the range of about 10 to about 20 seconds.

Alternatively, the product can be subjected to a hot air puffing cooking process. The product can be puffed using any standard commercial equipment, such as a Wolverine JetZone Dryer. Depending upon the product, the oven typically is heated to between about 400° and 475° F. and the product pieces or pellets are heated until they have popped. The popped product are dried to a desired crisp texture, the entire process typically requiring about 10 to 30 seconds.

The puffed or fried products, following cooking, can be coated with one or more toppings if desired, in manners known in the snack food industry. In one embodiment, the products are sprayed with an edible oil or fat prior to dusting with a flavorful topping, thus enhancing adhesion of the topping to the surface of the products. Vegetable oils having a melting point below about 95° F. are preferred for use during the oil spraying step, with 90° F. melt seasoning oils such as, for example, cottonseed oil, soybean oil, and the like being most preferred.

The invention is further described in the following examples, which are provided for illustrative purposes and are not intended to be limiting.

EXAMPLE 1

Orange Chips

Oranges were peeled and washed, then milled through an Urschel high speed mill equipped with a 0.020 inch millhead to produce a watery fruit pulp. Equal parts by weight of corn meal and rice meal were mixed together and then blended with the orange pulp such that the blended product contained 37% by weight orange pulp, 31.5% by weight rice meal and 31.5% by weight corn meal. The blending was carried out in a standard ribbon blender. The blended product was then fed into a Baker-Perkins twin screw extruder. The feedstock was added at the mid-port of the extruder barrel so that only the last half of the screw was used in the operation. The extruder conditions were as follows:

Screw dimensions: 15/1 length/diameter
die: 6" wide Johnson ribbon die adjusted to yield 0.020"–0.030" thick stretched ribbon
die temperature: 240° F.
die pressure: 200–400 psi
barrel temperature: #5–240° F., #4–80° F.
screw RPM: 300
residence time: 30–40 seconds in extruder
ribbon velocity: 10 ft.–20 ft. per minute.

The product was extruded through a linear die and stretched to thin the ribbon. This was accomplished by laying the ribbon on a conveyor and moving the conveyor at a faster speed than the speed of the extrudate as it exited the die.

The ribbon exiting the extruder was hot and sticky. Within six feet of the extruder, however, it had cooled to touch. An air current (ambient temperature) was passed over the ribbon to dry it such that it would not stick to the conveyor belt. The air current was passed over the ribbon for a distance of about 30 feet to further dry and harden it so that it could be easily cut. The drying time was about 3–6 minutes.

The ribbon then was cut into rectangular pieces with an Urschel ribbon cutter. The resulting pellets were dried under ambient air currents on trays for several hours until the moisture level of the pellets had been reduced to about 12%. The product then was divided into two batches. One batch was cooked by frying the pellets for 15–20 seconds in oil heated to 375° F. The other batch was cooked in a JetZone hot air popper for 15–20 seconds at 425°–450° F.

The product resulting from the hot air popping method was sprayed with oil in a tumbler and then both products were dusted with sweet orange seasonings in a tumbler.

The resulting products had similar taste profiles of sweet citrus/orange. The texture of the hot air popped product was crunchier than the fried version; however, both possessed a crisp, crunchy texture.

EXAMPLE 2

Apple Chips

Apples were washed, de-stemmed and milled through an Urschel high speed mill equipped with a 0.020" mill head to produce a watery fruit pulp (approximately 85% moisture).

15.2 pounds of the apple pulp were blended with 15.1 pounds of rice meal, 15.0 pounds of corn meal, and 2.0 pounds of sucrose in a standard ribbon blender for five minutes. The feedstock was then fed into a Baker Perkins 50 mm extruder similar to that used in the procedures of Example 1.

Extruder conditions were essentially the same as in Example 1, and the ribbon handling and pellet drying procedures were similar to those of Example 1.

The resulting dried pellets of about 12% moisture were popped in frying oil heated to 375° F. The fry time to bubble endpoint was 20 seconds. The popped pellets were then coated with a cinnamon sugar seasoning at a 10% level. The resulting product had a pleasant flavor profile dominated by sweet cinnamon. The apple flavor was well rounded but low.

EXAMPLE 3

Apple and Milk Chips 5.2 pounds of apple pulp, prepared as in Example 2, were blended with an equal amount of whole milk. The resulting mixture (approximately 96% moisture) was blended with 5.1 pounds of rice flour, 5.1 pounds of rice meal, 5.0 pounds of de-germed corn meal, and 5.0 pounds of milled whole corn in a ribbon blender similar to that described in Example 1.

The resulting feedstock ribbon and pellets were handled as described in Example 2.

The pellets then were hot air popped in a pilot plant-sized Wolverine Corporation jet zone oven. The chamber of the oven was 13" high with a 10.25" inside diameter. Nine equally spaced, high velocity, air delivery tubes were positioned 3.5" above the bottom pan of the chamber.

The oven was preheated to 450° F.; the bottom pan of the oven was removed and 100 grams of the apple/milk pellets were quickly added. The pan was then reinserted into the oven for 20 seconds. The pellets were completely popped after about 15 seconds and the additional five seconds were used to dry the product to a crisp texture.

The popped pellets then were sprayed with 20% vegetable oil and then coated with a cinnamon/sugar mixture similar to that described in Example 2. The resulting product had a desirable crunchy texture and a strong sweet cinnamon flavor note. The apple and milk flavor notes were well rounded but weak.

EXAMPLE 4

In addition to the foregoing, chips can be made using other high moisture, pulp-containing materials and various liquids in which all, or almost all, of the

| | Sweet Potato Chips | Tomato Chips | Onion Chips | Grape Chips | Potato Chips | Salad Chips* |
|---|---|---|---|---|---|---|
| high moisture material (lbs) | 10.3 | 10 | 10 | 10.2 | 10.2 | 10.2 |
| rice meal (lbs) | 6.5 | 9.5 | 9 | 10.1 | 10.1 | 10.2 |
| corn meal (lbs) | 6.5 | 9.5 | 9 | 10.0 | 10.0 | 10.1 |
| calcium carbonate | | | | | | 100 grams |

*Lettuce, celery, onions, spinach, tomatoes.

To make any of these, or other fruit or vegetable-containing chips, the high moisture raw material is milled to produce a watery pulp. The base ingredients are mixed together and then blended with the soggy pulp. The blended product is fed into an extruder, extruded and stretched to form a thin ribbon. An air current is passed over the ribbon to dry and harden it so that it can be cut easily.

The ribbon is cut into pieces of a desired size and shape which then are dried until the moisture level is less than about 15%. The pieces then are cooked, by either frying in oil or baking in a hot air popper. If desired, the cooked products can be dusted with seasonings.

EXAMPLE 5

The table below shows suitable content of various base materials and various liquid high moisture materials:

| | Milk | Pepsi | Beer |
|---|---|---|---|
| high moisture material (lbs) | 9.2 | 10.2 | 8.2 |
| new meal (lbs) | 9.1 | 10.1 | 8.1 |
| corn meal (lbs) | 9.0 | 10.0 | 8.0 |
| wheat flour (lbs) | — | — | 6.0 |
| milled rice (lbs) | 2.0 | — | |
| rice flour (lbs) | | 4.0 | |

To make any of these chips, or others wherein the high moisture material is a beverage or other liquid, the liquid is blended with the base ingredients. The blended material is fed into an extruder and processed as described in Example 4.

Although the invention has been described in connection with certain preferred embodiments and specific examples, it is not so limited. Modifications within the scope of the claims will be apparent to those skilled in the art.

I claim:

1. A process for preparing a stable snack food product which comprises:
   (a) vigorously macerating to a soggy pulp a high moisture fruit or vegetable material which comprises plant cells and provides a source of flavor and substantially all of the moisture for the snack food product, whereby a substantial proportion of the plant cells are disrupted;
   (b) blending said soggy pulp with at least one low moisture farinaceous base ingredient to produce a dough comprising from about 25% to about 50% moisture;
   (c) extruding said dough into a desired shape; and
   (d) drying said extruded product to about 8% to about 15% moisture.

2. The process of claim 1 wherein said high moisture material comprises at least one fruit or vegetable which has been macerated to disrupt cell walls.

3. The process of claim 2 wherein said high moisture material comprises apples, oranges, bananas, pears, lemons, grapes, tomatoes, carrots, celery, lettuce, spinach, onions, potatoes, sweet potatoes, or combinations thereof.

4. The process of claim 1 wherein said low moisture farinaceous base ingredient comprises at least one material selected from the group consisting of meals, flours and starches derived from corn, wheat, rice, oats, barley, potatoes, rye, tapioca, and other cereal crops, legumes and tubers.

5. The process of claim 1 wherein the dough comprises about 35% moisture.

6. The process of claim 1 wherein said high and low moisture ingredients are blended together by injecting them through one or more ports of an extruder and then contacting them with co-rotating twin extruder screws in the barrel of the extruder.

7. The process of claim 1 wherein the product exiting the extruder has a moisture content of about 30%.

8. The process of claim 7 wherein the product exiting the extruder is cooled, partially dried and then cut into pieces of a desired size prior to being dried to about 8% to about 15% moisture.

9. The process of claim 1 further comprising the step of (e) cooking said dried product to produce a shelf stable snack food product.

10. The process of claim 9 wherein said dried product is cooked under puffed food product cooking conditions to a temperature at which the product puffs.

11. The process of claim 9 wherein the product is cooked by baking at a temperature of about 400° F. to about 475° F. for about 10 to about 30 seconds.

12. The process of claim 9 wherein said product is cooked by frying it in an edible oil at a temperature that is between about 220° F. and the smoking point of the oil.

13. The process of claim 9 further comprising the step of coating the cooked product with one or more toppings.

14. The process of claim 1 wherein the high moisture material is oranges, and the low moisture material is a mixture of corn meal and rice meal.

15. The process of claim 14, wherein the blended product of step (a) comprises about 37% by weight orange pulp, about 31.5% by weight rice meal and about 31.5% corn meal.

16. The process of claim 1 wherein the high moisture material is apples and the low moisture base material is a combination of rice meal, corn meal and sucrose.

17. The process of claim 16, wherein the blended product of step (a) comprises about 32% by weight apples, about 32% by weight rice meal, about 32% by weight corn meal and about 4% by weight sucrose.

18. The process according to claim 1 wherein a liquid which provides additional flavor is mixed with said soggy pulp and said base ingredients to provide a dough comprising from about 25% to about 50% moisture.

19. The process of claim 18 wherein said high moisture material comprises macerated apples, said liquid comprises milk, and said low moisture material comprises a combination of rice flour, rice meal, corn meal and milled whole corn.

20. The process of claim 19 wherein the blended product comprises about 17% by weight apples, about 17% by weight milk, about 17% by weight rice meal, about 17% by weight rice flour, about 16% corn meal, and about 16% milled corn.

21. A process for preparing a snack product, comprising a first stage comprising the steps of:
 (a) vigorously macerating to a soggy pulp a high moisture fruit or vegetable material which comprises plant cells and provides a source of flavor and substantially all of the moisture for the snack food product, whereby a substantial proportion of the plant cells are disrupted;
 (b) blending said soggy pulp with at least one low moisture farinaceous base ingredient to produce a dough comprising from about 25% to about 50% moisture;
 (c) extruding the dough into a desired shape;
 (d) drying said extruded product to about 8% to about 15% moisture to thereby produce a storage-stable pellet; and
 (e) transporting the pellet to a cooking and packaging site; and a second stage comprising
 (f) cooking the pellet; and
 (g) packaging the pellet.

* * * * *

UNITED STATES PATENT AND TRADEMARK OFFICE
CERTIFICATE OF CORRECTION

PATENT NO. : 5,132,127
DATED : July 21, 1992
INVENTOR(S) : Lawrence W. Wisdom

It is certified that error appears in the above-identified patent and that said Letters Patent is hereby corrected as shown below:

On the title page, in the ABSTRACT, line 3 "stack" should be --snack--.

Col. 2, line 57 "over" should be --per--.

Col. 7, line 56 after "the" insert --solids are soluble. The table provided below shows suitable content of various low moisture base materials and various high moisture materials.--

Signed and Sealed this

Twelfth Day of October, 1993

*Attest:*

BRUCE LEHMAN

*Attesting Officer*     *Commissioner of Patents and Trademarks*